United States Patent

[11] 3,611,434

| [72] | Inventor | Clive Lynn Jones<br>Bishopston, Wales |
|---|---|---|
| [21] | Appl. No. | 829,910 |
| [22] | Filed | June 3, 1969 |
| [45] | Patented | Oct. 5, 1971 |
| [73] | Assignee | National Research Development Corporation |
| [32] | Priority | June 7, 1968, Jan. 2, 1969 |
| [33] | | Great Britain |
| [31] | | 27259/68 and 325/69 |

[54] IMPROVED FREQUENCY MULTIPLYING ELECTRICAL CIRCUITS FOR MOTOR SPEED CONTROL
3 Claims, 23 Drawing Figs.

[52] U.S. Cl............................................ 318/227,
318/231, 321/65, 321/69, 323/75

[51] Int. Cl........................................................ H02p 5/40
[50] Field of Search....................................... 318/227,
231, 341; 321/4, 7, 65, 69; 323/75

[56] References Cited
UNITED STATES PATENTS

| 736,884 | 8/1903 | Shoemaker et al. | 321/4 X |
| 2,420,213 | 5/1947 | Walker | 321/69 |
| 2,845,588 | 7/1958 | Sampietro | 318/231 |
| 3,286,150 | 11/1966 | Wilson et al. | 318/245 |

Primary Examiner—Gene Z. Rubinson
Attorney—Cushman, Darby & Cushman

ABSTRACT: An electric motor is fed through a rectifying circuit with a bypass circuit connected across the motor for removing the DC component of the rectified current so that the motor is fed with an AC current having a higher frequency than that of the supply and means are provided for varying the speed of the motor.

IMPROVED FREQUENCY MULTIPLYING ELECTRICAL CIRCUITS FOR MOTOR SPEED CONTROL

BACKGROUND OF INVENTION

A great advantage of cage type or squirrel cage induction motors over other types of electric motor is their cheapness and ruggedness, due principally to the absence of any rubbing contacts or insulated windings on the motor.

One limitation of such motors is that the highest speed at which they can be driven as a motor is, in the case of a single-phase two pole motor, approximately equal to the frequency of the alternating voltage supplied to the stator windings.

The main object of the invention is to provide a frequency-multiplying circuit which may be used to increase the speed of an induction motor relative to the supply frequency using relatively simple apparatus.

SUMMARY OF INVENTION

According to one aspect the invention comprises a frequency-multiplying electrical circuit including a whole wave rectifier circuit adapted to be fed from an AC supply and capacitively coupled to a load circuit to feed rectified current thereto, together with a resistive bypass circuit connected to bypass the DC component of the rectified current from the load circuit and the arrangement being such that the frequency of the output from the rectifier circuit is a multiple of the input.

According to another aspect the invention comprises a polyphase rectifier circuit adapted to be fed from a polyphase supply and having the outputs connected in parallel to a single-phase load so that the load is fed from the individual phase circuits sequentially, together with a resistive bypass circuit connected across the load to bypass the DC component of the rectified currents.

In applying the invention to an motor the induction motor stator will constitute the load.

It will be appreciated that in the case of a single-phase supply using a whole wave rectifier the frequency of the AC voltage fed to the load will be double the frequency of the AC supply to the rectifier.

In the case of a three-phase supply the frequency of the voltage fed to the load will be three times the frequency of the AC supply using half-wave phase rectifiers or, using full-wave rectifiers, the voltage fed to the load will be at six times the frequency of the AC supply.

Preferably the rectifiers are solid state rectifiers.

Preferably the bypass circuit has a high inductance so as to block the AC component of the rectified current. The bypass circuit must, of course, be resistive and capable of dissipating the energy of the DC component of the current output from the rectifier.

According to a further feature the control apparatus is arranged to vary the frequency of the output current. In cases in which the supply feeds an induction motor such control apparatus provides a speed control for the motor.

According to one embodiment switching apparatus is provided whereby the whole wave rectifier circuit may be converted at will to a half-wave rectifier circuit so as to halve the frequency of the AC output. Such a control would of course enable a motor to be run at half speed.

According to another embodiment means are provided for varying the proportions of current which flow through the load and the bypass circuit. Such a control may be provided by a variable resistance in series with the load or alternatively in series with the bypass circuit, if desired the bypass circuit may consist of a variable resistance. In other cases variable resistances may be provided both in the load circuit and also in the bypass circuit and these may be ganged.

In the case of a polyphase circuit-switching means may be provided for converting a polyphase circuit to a single-phase circuit.

An important application of the invention is in fan heaters, such for example as hair driers in which the energy of the DC component can be usefully dissipated in the heater.

BRIEF DESCRIPTION OF DRAWINGS

In order that the invention may be more clearly understood reference will now be made to the accompanying drawings, in which.

PREFERRED EMBODIMENTS

Figures 1, 2:
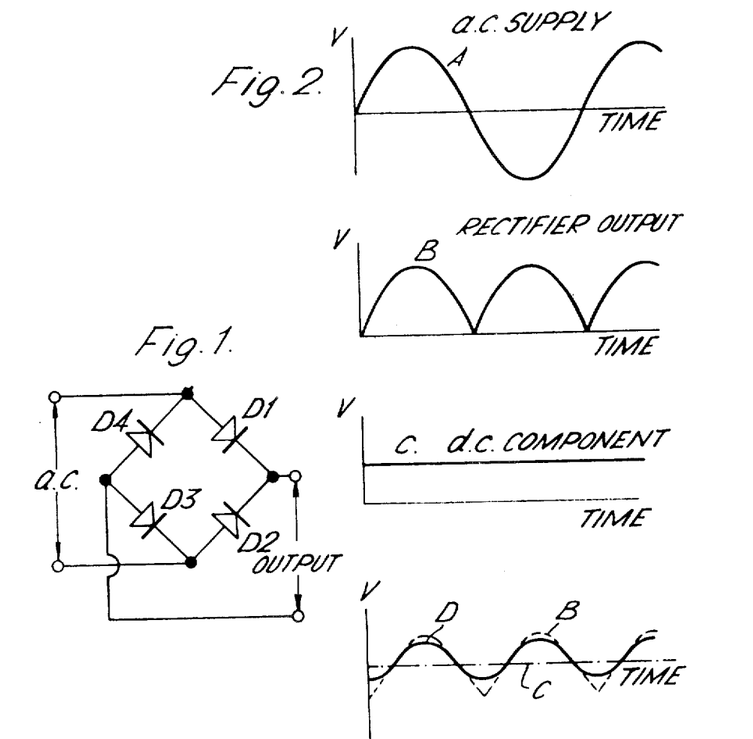
FIG. 1 shows a well-known single-phase bridge rectifier.
FIG. 2 shows graphically the currents arising in the rectifier of FIG. 1.

FIG. 1 shows a well-known bridge rectifier circuit comprising four rectifiers D1, D2, D3 and D4, the AC input is applied across the junctions between the rectifiers D4 and D1 and the junction between the rectifiers D3 and D2.

The DC output is taken from the junction between D3 and D4 and the junction between D1 and D2.

Referring now to the graphs shown in FIG. 2, waveform A is the AC supply to the bridge rectifier. Waveform B is the output from the bridge rectifier. This may be shown to comprise a DC component and an AC component. The DC component C is shown in the third graph while the last graph shows how the AC component D may be obtained by subtracting the waveform C from the waveform B. It will clearly be seen that the waveform D is double the frequency of the supply waveform A.

Figure 3:
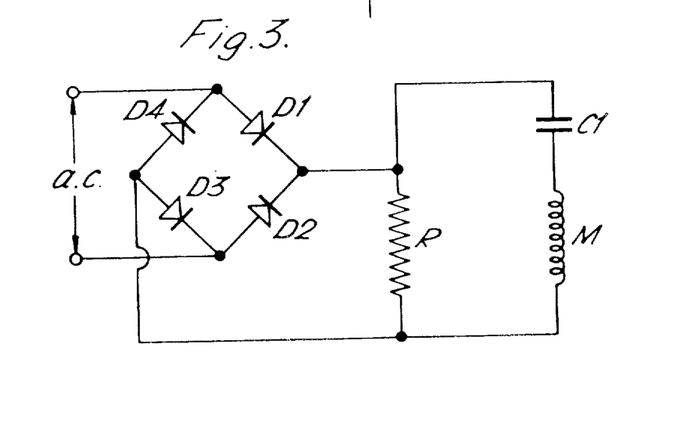
FIG. 3 shows a single-phase induction motor fed through a frequency-multiplying circuit embodying the invention.

FIG. 3 shows how this rectifier circuit may be used to double the frequency fed to a motor M. In this case the induction motor M is fed from the output of the rectifier circuit through a capacitive coupling C1 while a bypass circuit R removes the DC component from the current fed to the motor M. It will readily be seen that with this arrangement the motor M is fed with AC at a frequency double that of the AC supply fed to the bridge rectifier. By such an arrangement it is possible to design the motor to run at speeds twice the frequency of the AC supply, assuming of course that the motor winding has a single pair of poles and that suitable starting arrangements, well known in the art, are provided.

Figure 4:
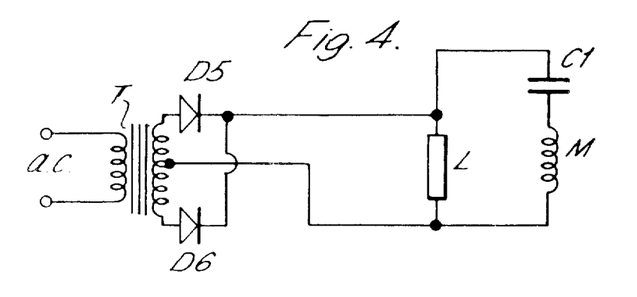
FIG. 4 shows an alternative arrangement to that shown in FIG. 3.

FIG. 4 shows an alternative arrangement to the bridge rectifier of FIG. 3 in which the single-phase AC supply is fed through a transformer T having a center-tapped secondary winding feeding a biphase rectifier formed by the individual rectifiers D5 and D6 L being the bypass circuit for the DC component.

Figure 5:
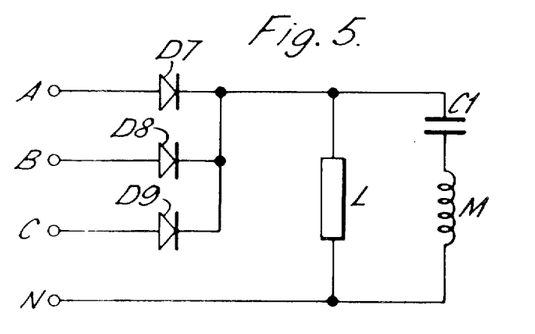
FIG. 5 shows a motor as fed from a three-phase supply.

FIG. 5 shows an induction motor fed from a three-phase supply. In this arrangement each of the three-phase lines A, B, C is fed to one side of the motor through a respective half-wave rectifier D7, D8 and D9, and a common condenser C1, while the other side of the motor is connected to a common neutral line N.

Figure 6:
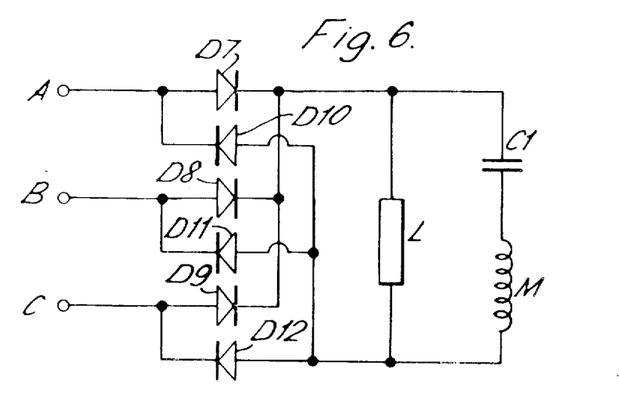
FIG. 6 shows the three-phase circuit of FIG. 5 modified to double the frequency, i.e. to give an output frequency six times the frequency of the supply.

FIG. 6 shows a modification of the arrangement of FIG. 5 in which the phase lines are fed through whole wave rectifiers and the common neutral line is dispensed with. Thus the rectifiers D7, D8 and D9 are connected to the upper side of the motor winding M through a capacitor C1 while the rectifiers D10, D11 and D12 are connected to the lower side of the motor winding M. Such arrangements enable the motor to be driven at six times the frequency of the AC supply, assuming of course that the motor stator winding has a single pair of poles.

It will readily be appreciated that the arrangements above shown provide a simple and cheap method of increasing the speed of a motor and the invention has numerous applications in small motor drives where the cost of the heat dissipated in the bypass resistor is negligible, for example, in fan heaters, hair driers and the like. In the case of fan heaters the heat dissipated in the bypass circuit may be usefully employed for heating purposes.

In some cases the rectifiers may be controlled rectifiers, e.g. thyristors, which could be arranged to provide a degree of speed control.

It is also possible to cascade the rectifier circuits but in such a case the current output would be considerably reduced and hence would only be useful for quite small load currents.

Figure 7:
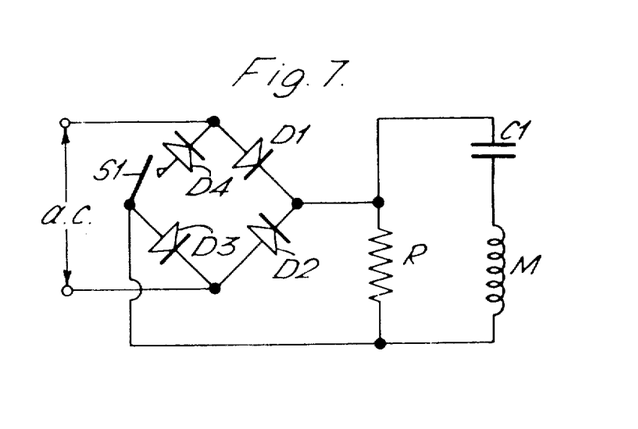
FIG. 7 shows the frequency-changing supply circuit which corresponds to FIG. 3 but modified to provide two alternative frequencies.
Figure 8:
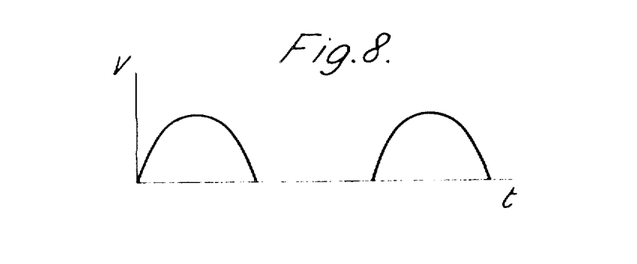
FIG. 8 shows the voltage waveform obtainable with FIG. 7.

FIG. 7 shows an arrangement corresponding to FIG. 3 but with the addition of the switch S1. When the switch S1 is closed the circuit operates normally as a whole wave rectifying circuit and the output frequency is double the input frequency. When, however, the switch S1 is opened the circuit becomes a half-wave-rectifying circuit and the output frequency is the same as the input frequency as shown graphically in FIG. 8.

Figure 9:
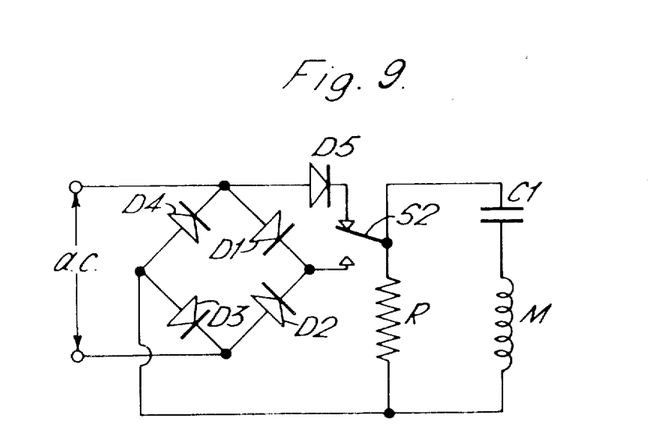
FIG. 9 shows an alternative arrangement to FIG. 7.

FIG. 9 shows an alternative arrangement in which a two-way switch S2 and an additional rectifier are added. In the position shown, with the switch moved to its upper position, the upper end of the bypass circuit R is connected to the junction of D1 and D4 and the circuit acts as a half-wave rectifier, with the input and output frequencies the same. When the switch S2 is moved over to the lower position however, the circuit reverts to its normal full-wave-rectifying state and the output frequency is double the input frequency. It will be noted that in the first position the only operative rectifiers are D5 and D3 in series.

Figure 10:
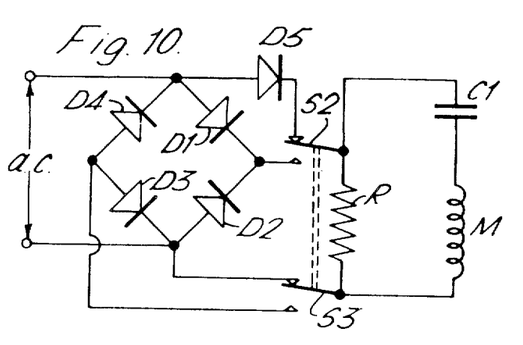
FIG. 10 shows another arrangement using a two-pole switch.

FIG. 10 shows a modification of the arrangement of FIG. 9 in which second two-way switch S3 is added; this switch is ganged with S2 and cuts out the rectifier D3 in the half-wave position so that only the rectifier D5 is operative.

Figure 11:
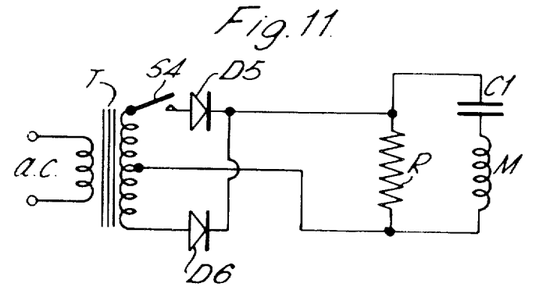
FIG. 11 corresponds to FIG. 4 modified to provide two output frequencies.

FIG. 11 shows FIG. 5 modified by the addition of a switch S4. When the switch S4 is closed the circuit operates normally to give frequency doubling, but when the switch S4 is opened the output frequency is the same as the input.

Figure 12:
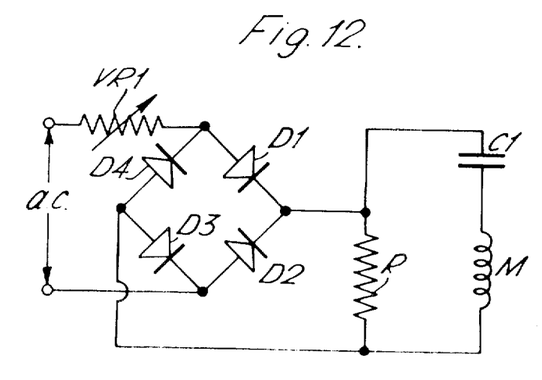
FIG. 12 shows FIG. 4 modified to provide a variable input voltage and hence a continuous variation of speed of an induction motor.

FIG. 12 shows the arrangement of FIG. 3 in which a variable resistance VR1 is inserted in the input circuit. Such an arrangement can be used for varying the speed of an induction motor fed by the circuit.

Figure 13:
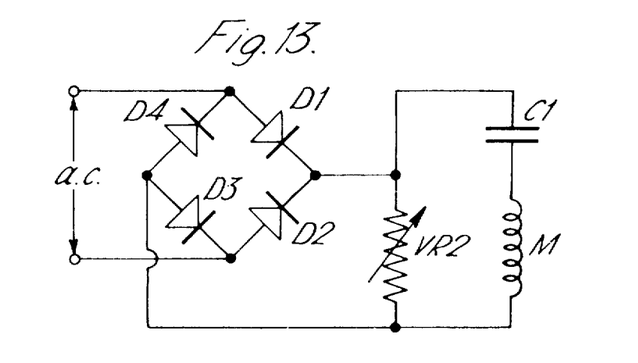
FIG. 13 shows how the speed of an induction motor may be varied by varying the proportions of current passing through the motor and bypass circuit.

FIG. 13 shows a modification of the same FIGURE in which the bypass circuit is formed by a variable resistance VR2, this permits control of the proportion of current flowing through the bypass circuit and control of the speed of an induction motor.

Figure 14:
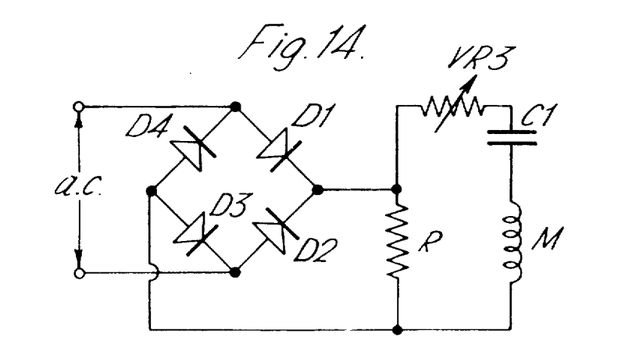
FIG. 14 shows an arrangement alternative to FIG. 13.

FIG. 14 shows an alternative arrangement to FIG. 13 in which a variable resistance VR3 is inserted in the motor circuit in place of the variable resistance VR2.

Clearly the arrangements of FIGS. 13 and 14 could be combined and both resistances VR2 and VR3 employed in which case the two variable resistances would be ganged.

Figure 15:
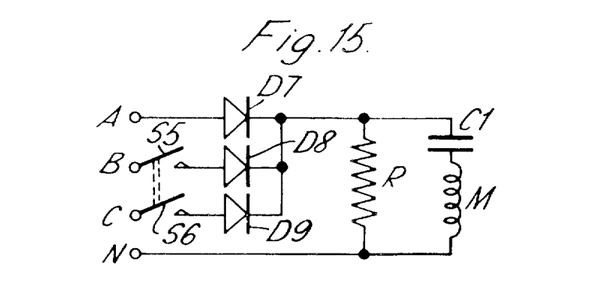
FIG. 15 shows an arrangement for switching a three phase half-wave rectifying circuit from three-phase to single-phase.

FIG. 15 corresponds to FIG. 5 and shows a three-phase half-wave rectifier arrangement in which ganged switches S5 and S6 are added. When the switches are closed the circuit acts normally and all three phases are operative; when, however, the switches are opened, phases B and C are cut out and the circuit acts as single-phase circuit. In the case of an induction motor this will give a speed reduction to one-third of the previous speed.

Figure 16:
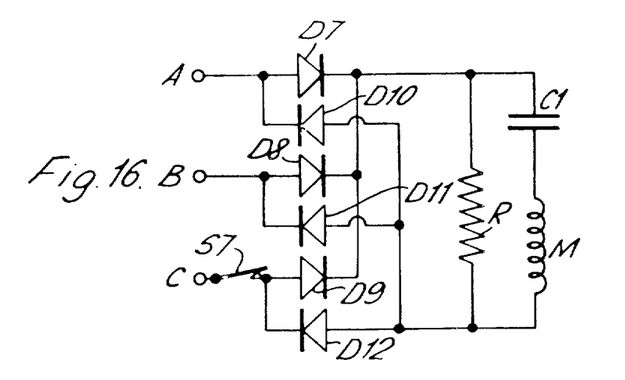
FIG. 16 shows a corresponding switching arrangement for a three-phase whole wave rectifying circuit.

FIG. 16 corresponds to FIG. 6 with the addition of the switch S7, when the switch is closed the circuit acts normally, i.e. as a three-phase whole wave rectifier giving a frequency multiplication of six times, when the switch S7 is opened the circuit changes to a single-phase whole wave rectifier, giving a frequency multiplication of 4.

Figure 17:
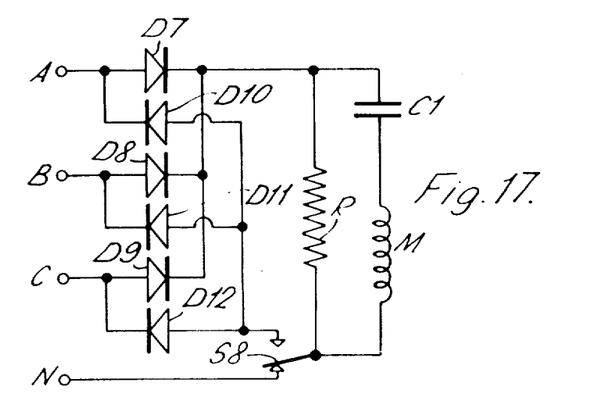
FIG. 17 shows a circuit for switching a three-phase whole wave rectifying circuit to three-phase half wave.

FIG. 17 shows an alternative arrangement to FIG. 16 in which the switch S7 is replaced by the switch S8 in the neutral line. When this switch is in the upper position the circuit acts normally, i.e. as a three-phase whole wave rectifier, when the switch is in the lower position the circuit acts as a single-phase half-wave rectifier with a frequency one-sixth of that obtained with the former arrangement.

Figure 18:
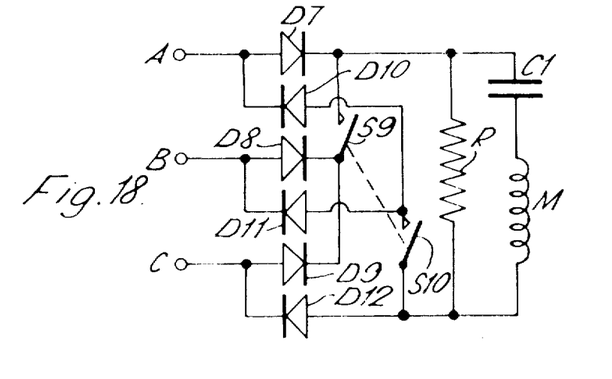
FIG. 18 shows an arrangement for switching a three-phase whole wave rectifying circuit to a single-phase half-wave circuit.

FIG. 18 shows another arrangement in which two ganged switches S9 and S10 are employed; this produces the same result, i.e. with the switches in the closed position the circuit acts normally as a three-phase whole wave rectifier with a frequency multiplication of 6, with the switch in the open position; however, the circuit acts as a single-phase half-wave rectifier circuit, with the output frequency the same as the frequency of the supply.

It will be appreciated that the variable resistances shown in FIGS. 12, 13 and 14 may be used in any of the other arrangements employing switching to give additional speed control in the case of the circuit supplying an induction motor.

Figure 19:
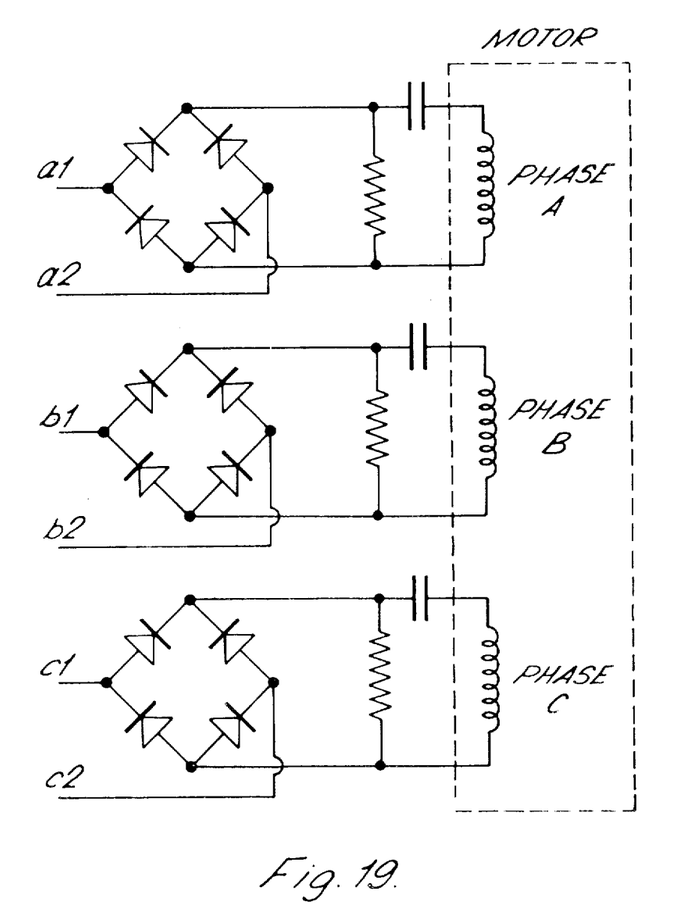
FIG. 19 shows an arrangement in which a three-phase supply is fed to a three-phase load.

FIG. 19 shows a further arrangement in which a three-phase supply is fed to a three-phase load shown as the stator of a squirrel cage induction motor. Each individual phase circuit includes a whole wave rectifier and resistive bypass circuit, arranged as shown in FIG. 3.

Switching to vary the speed can be included, for instance, in accordance with the arrangements shown in FIGS. 7 or 9, the switches for the phases being ganged.

Figure 20:
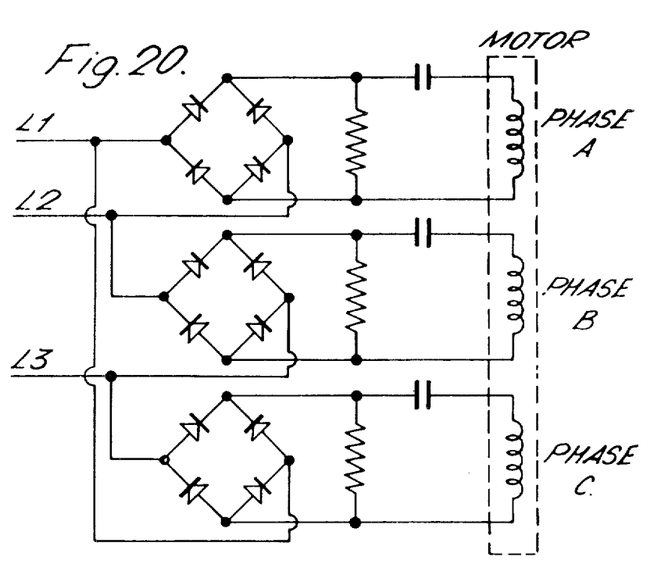
FIG. 20 shows the arrangement of FIG. 19 in which the load is delta connected.
Figure 21:
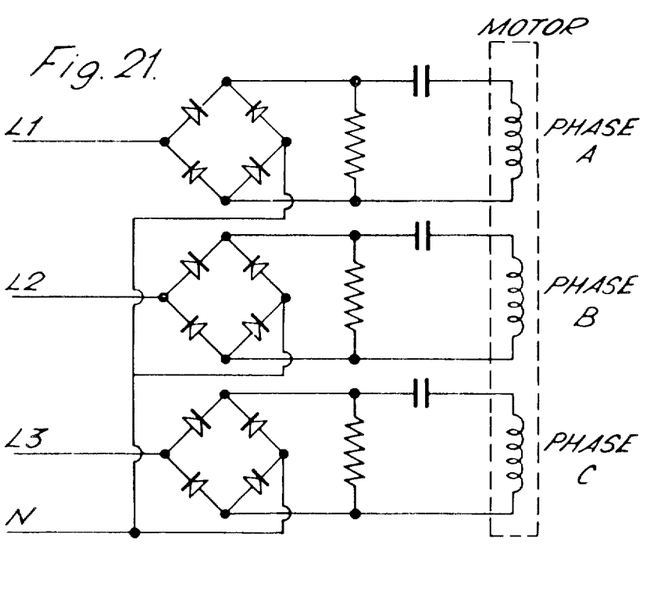
FIG. 21 shows an alternative arrangement in which the load is star connected.

FIG. 20 shows a modification of the arrangement of FIG. 19 in which the load is delta connected, a neutral line is not required in this arrangement, and FIG. 21 shows the alternative arrangement in which the load is star connected, a neutral line being employed with this arrangement.

Figure 22:
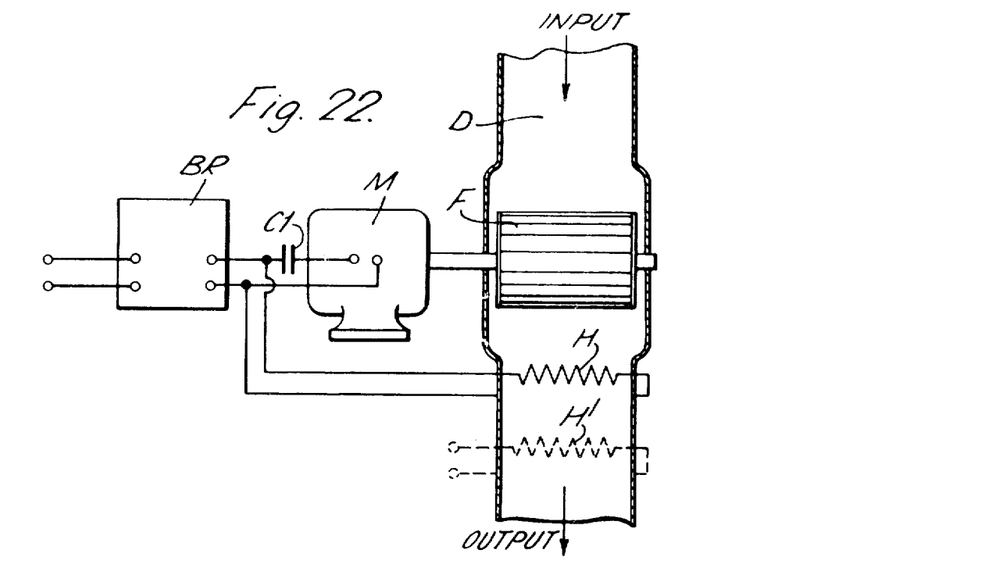
FIG. 22 is an explanatory view showing how the invention can be applied to a fan heater using a single-phase AC driving motor.

As mentioned above the invention is applicable to fan heaters and FIG. 22 shows an example of such an arrangement in which a rectifier circuit BR, which may be any one of the single-phase bridge rectifiers shown in earlier figures of the three-phase arrangement of FIG. 5, feeds a single-phase motor M mechanically coupled to drive a fan blower F, located in a gas supply duct D.

The output from the rectifier circuit is connected both to the motor and also to a heater H which constitutes the bypass circuit above described, and which is located in the duct D so as to heat the gas passing through it. In this way the heat developed in the bypass heater H is usefully dissipated.

In some cases additional heat may be required and in such cases an additional heater H', heated directly from the supply may be provided in the duct.

Figure 23:
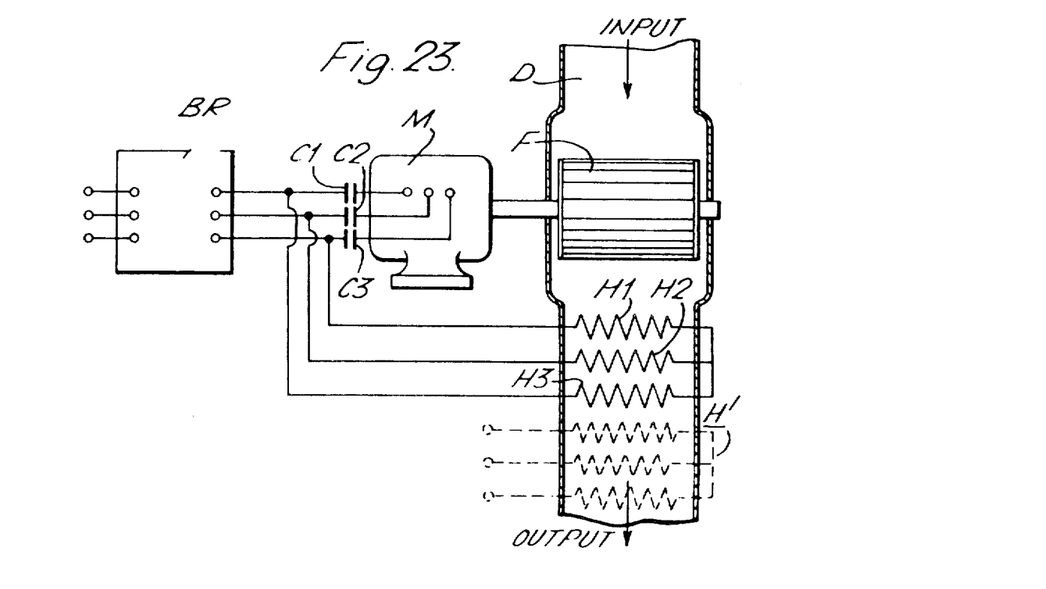
FIG. 23 is a similar view but showing an arrangement in which the fan heater is driven by a three-phase AC motor.

FIG. 23 shows a corresponding arrangement using a three-phase motor, in the arrangement the rectifier circuit BR' could be any of the three-phase circuits above described.

In this arrangement three heaters H1, H2 and H3 are shown, these act as bypass circuits for the respective phases. The heaters are shown connected in star, they could of course be connected in delta or the phases kept in separate circuits.

As in the arrangement of FIG. 22 an additional heater H' fed directly from the mains may be provided if additional heat is required. Clearly the circuits could be modified for six phases if required.

Apparatus such as shown in FIGS. 22 and 23 may be used for a variety of purposes, for example in space heaters for industrial or domestic heating systems, in fan hair driers and clothes driers and in other applications in which a flow of heated gas is required.

I claim:

2. A frequency multiplying circuit for use with an alternating current electrical supply and an induction motor, said circuit comprising:
   a rectifier circuit having an input for connection to said alternating current supply and an output for supplying rectified current,
   a load circuit including said induction motor,
   capacitive coupling means between the output of said rectifier circuit and said motor for passing the alternating current component of said rectified current to said motor, and
   at least one resistive bypass circuit connected across the output of said rectifier circuit for bypassing the direct current component of said rectified current away from said motor,
   said rectifier circuit comprising a whole wave rectifier circuit and further comprising switching means for effectively changing said whole wave rectifier circuit to operate as a half wave rectifier circuit thereby effecting a speed control of the motor.

3. A frequency multiplying circuit for use with a polyphase alternating current electrical supply and and induction motor, said circuit comprising:
   a rectifier circuit having an input for connection to said polyphase alternating current supply and an output for supplying rectified current,
   a load circuit including said induction motor,
   capacitive coupling means between the output of said rectifier circuit and said motor for passing the alternating current components of said rectified current to said motor, and
   at least one resistive bypass circuit connected across the output of said rectifier circuit for bypassing the direct current component of said rectified current away from said motor,
   said rectifier circuit comprising a half-wave polyphase rectifier circuit, and
   switching means for changing said polyphase rectifier circuit to operate as a single phase rectifier circuit.